United States Patent [19]

Takatsu et al.

[11] Patent Number: 5,296,952
[45] Date of Patent: Mar. 22, 1994

[54] DOUBLE-LAYER LIQUID CRYSTAL DEVICE HAVING A THREE DIMENSIONAL NETWORK STRUCTURE

[75] Inventors: Haruyoshi Takatsu; Kiyofumi Takeuchi, both of Tokyo; Yasuo Umezu, Saitama, all of Japan

[73] Assignee: Dainippon Ink & Chemicals Inc., Tokyo, Japan

[21] Appl. No.: 100,207

[22] Filed: Aug. 2, 1993

Related U.S. Application Data

[63] Continuation of Ser. No. 887,814, May 26, 1992, abandoned.

[30] Foreign Application Priority Data

| May 27, 1991 | [JP] | Japan | 3-121102 |
| Jul. 9, 1991 | [JP] | Japan | 3-168224 |
| Jan. 31, 1992 | [JP] | Japan | 4-016315 |

[51] Int. Cl.$^5$ .................................. G02F 1/133
[52] U.S. Cl. ................................. 359/53; 359/52; 359/63; 359/70; 359/73; 359/96
[58] Field of Search ................... 359/53, 51, 52, 63, 359/64, 70, 96, 73, 68

[56] References Cited

U.S. PATENT DOCUMENTS

| 3,963,312 | 6/1976 | Wild | 359/64 |
| 3,967,881 | 7/1976 | Moriyama et al. | 359/53 |
| 4,435,047 | 3/1984 | Fergason | 359/51 |
| 4,688,900 | 8/1987 | Doane | 359/94 |
| 4,688,901 | 8/1987 | Albert | 359/52 |
| 4,707,080 | 11/1987 | Fergason | 359/51 |
| 4,834,509 | 5/1989 | Gunjima | 359/94 |
| 4,886,343 | 12/1989 | Johnson | 359/53 |
| 5,103,328 | 4/1992 | Numao | 359/53 |
| 5,124,824 | 6/1992 | Kozaki et al. | 359/53 |
| 5,194,973 | 3/1993 | Isogai et al. | 359/53 |

FOREIGN PATENT DOCUMENTS

| 0313053 | 4/1989 | European Pat. Off. | |
| 005550 | 1/1977 | Japan | 359/52 |
| 0038150 | 3/1979 | Japan | 359/64 |
| 0100725 | 5/1986 | Japan | 359/64 |

OTHER PUBLICATIONS

Patent Abstracts of Japan, vol. 15, No. 296, No. JP3,102,326.
Patent Abstracts of Japan, vol. 8, No. 109, JP59-18925.
Patent Abstracts of Japan, vol. 4, No. 138, JP55-88022.

*Primary Examiner*—William L. Sikes
*Assistant Examiner*—Huy Mai
*Attorney, Agent, or Firm*—Armstrong, Westerman, Hattori, McLeland & Naughton

[57] ABSTRACT

A light scattering liquid crystal device having a double structure composed of (1) a first display panel of light scattering type which comprises a pair of transparent substrates each having a transparent electrode layer and a light controlling layer formed therebetween, said light controlling layer containing a liquid crystal material and a transparent solid substance and (2) a second display panel comprising a pair of transparent substrates each having an electrode layer and a liquid crystal material filled therebetween, selected from a guest-host type liquid crystal display panel containing a dichroic dye and a twisted or super-twisted nematic liquid crystal display panel having a pair of polarizers. The device achieves brightness and high contrast.

20 Claims, 8 Drawing Sheets

DOUBLE-LAYER LIQUID CRYSTAL DEVICE HAVING A THREE DIMENSIONAL NETWORK STRUCTURE

This application is a continuation of application Ser. No. 07/887,814 filed May 26, 1992, now abandoned.

FIELD OF THE INVENTION

This invention relates to a liquid crystal device achieving brightness and high contrast. More particularly, it relates to a liquid crystal device which can be electrically switched on or off at a high speed of response and is useful as information display boards for advertisement and various displays demanding brightness, e.g., watches, calculators, and computer terminals.

BACKGROUND OF THE INVENTION

Liquid crystal devices for practical use include TN (twisted nematic) or STN (super-twisted nematic) mode displays using nematic liquid crystals. Those utilizing ferroelectric liquid crystals have also been proposed.

The conventional devices require a polarizer and are therefore limited in brightness of the display.

It is known that use of a polymer film having dispersed therein microencapsulated liquid crystals makes it possible to produce large-sized and still inexpensive and high-contrast liquid crystal devices requiring neither a polarizer nor an alignment layer. Encapsulating materials proposed to date include gelatin, gum arabic, polyvinyl alcohol, etc. as disclosed in JP-W-58-501631 (the term "JP-W" as used herein means an "unexamined published international patent application") and U.S. Pat. No. 4,435,047. Such polymer-liquid crystal dispersed systems also include a dispersion of liquid crystals in an epoxy resin matrix (JP-W-61-502128), a film in which phase separation between liquid crystals and a polymer is fixed on exposure to light (JP-A-61-305528; the term "JP-A" as used herein means an "unexamined published Japanese patent application"), a dispersion of liquid crystals in a special ultraviolet-curing polymer (JP-A-62-2231), and a process for filming a mixture of polyester, liquid crystals, and a solvent (JP-A-63-144321).

However, the liquid crystal devices obtained by the techniques disclosed in JP-W-58-501631, JP-W-61-502128, and JP-A-61-2231 need a high driving voltage of at least 25 V and, in most cases, from 50 to 200 V for obtaining sufficient transparency. Further, the contrast ratio achieved with the liquid crystal devices disclosed in JP-A-61-305528 and JP-A-162615 is 10 at the highest and, in most cases, 8 or less, which is below the level required for practical use.

In order to satisfy the above-described characteristics of liquid crystal devices which are important for practical use, i.e., low power driving properties, high contrast, and multiplex driving properties, JP-A-1-198725 discloses a liquid crystal device having such a structure that a liquid crystal material forms a continuous phase in which a polymer forms a three-dimensional network.

The disadvantage of the above-mentioned light scattering type liquid crystal devices, when used as a display panel, is that the background black or any other color is not cut off even with no voltage applied and is slightly visible through opaqueness because of utilization of light scattering. This has made display of direct view type difficult, and particularly made full color display impossible.

SUMMARY OF THE INVENTION

Accordingly, an object of the present invention is to provide a light scattering liquid crystal device which achieves a black-and-white (hereinafter abbreviated as B/W), color, or full color display of direct view type without involving see-through of the background black or any other color on an opaque surface of a display with no voltage applied.

The present invention provides a light scattering liquid crystal device having a double structure composed of (1) a first display panel of light scattering type which comprises a pair of transparent substrates each having a transparent electrode layer and a light controlling layer formed therebetween, said light controlling layer containing a liquid crystal material and a transparent solid substance and (2) a second display panel comprising a pair of transparent substrates each having an electrode layer and a liquid crystal material filled therebetween.

In a first embodiment of the present invention, the second display panel is a guest-host type liquid crystal display panel containing a dichroic dye.

In a second embodiment of the present invention, the second display panel is a twisted nematic liquid crystal display panel having a pair of polarizers.

Where a twisted nematic liquid crystal display element usually employed alone for B/W display is used as the twisted nematic liquid crystal display panel, the device makes a clear B/W display.

In the first embodiment, where the guest-host type second panel has a color filter, the device makes a full color display.

In the second embodiment, where at least one of the polarizers of the second panel is a color polarizer, the device makes a color display, or where the second panel has a color filter, the device makes a full color display.

DETAILED DESCRIPTION OF THE INVENTION

The present invention is illustrated by referring to the accompanying drawings.

Figure 1A:
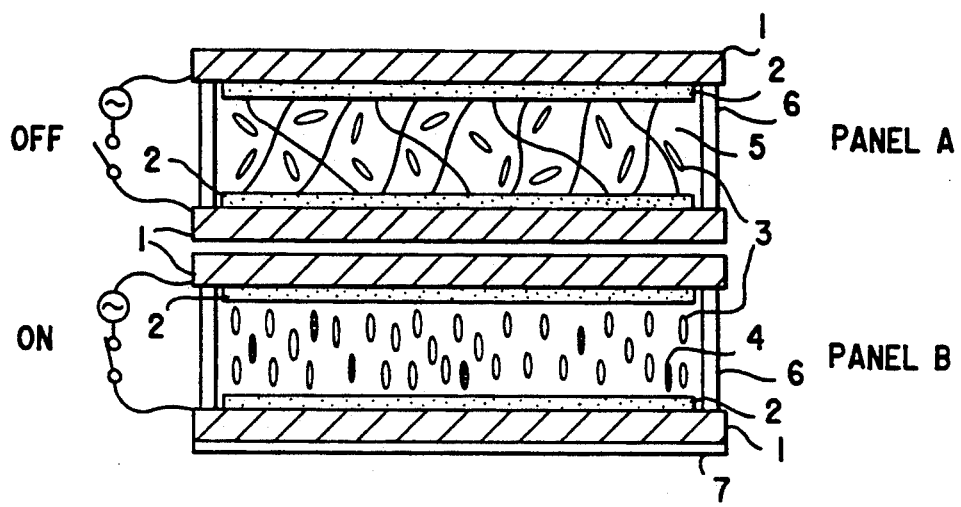
FIGS. 1 (a-b) illustrates a cross section of the B/W light scattering type liquid crystal device according to the present invention in which the second display panel contains a dichroic dye.
Figure 1B:
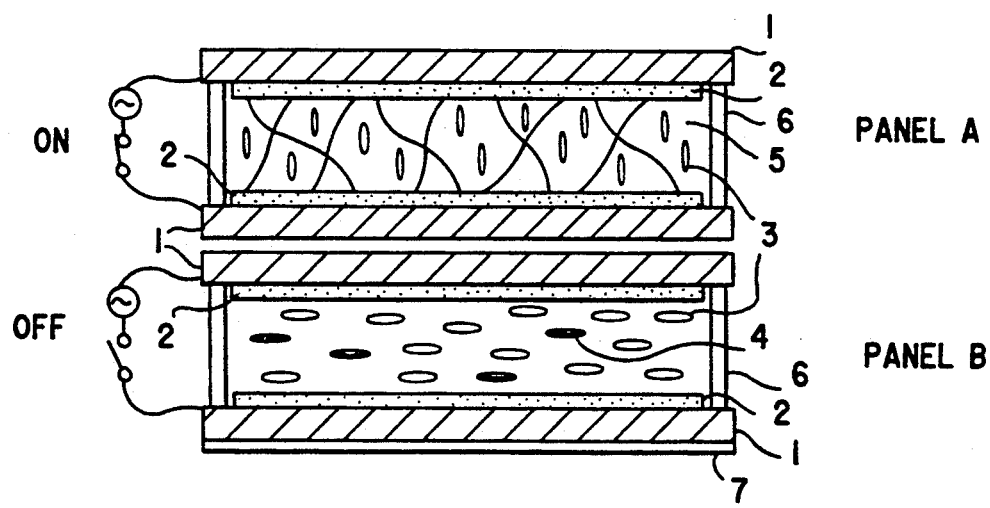
Figure 2A:
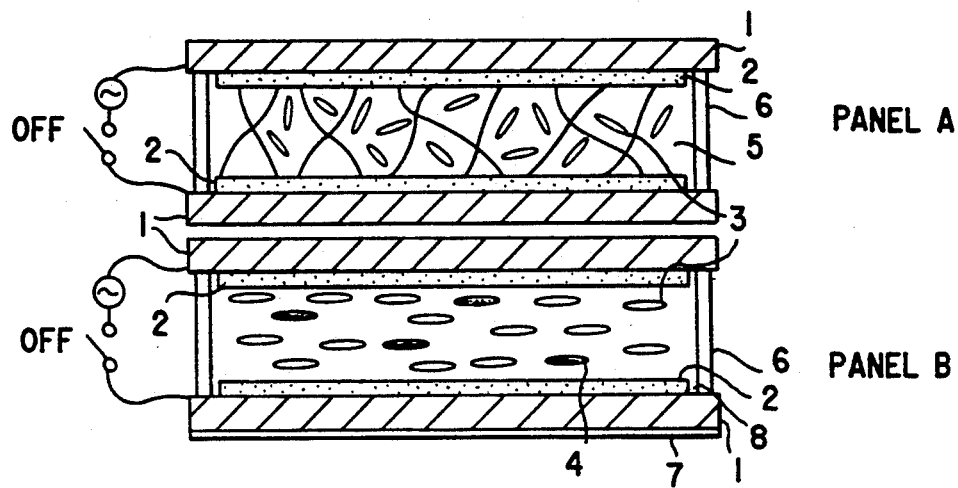
FIGS. 2 (a-b) illustrates a cross section of the full color light scattering type liquid crystal device according to the present invention in which the second display panel contains a dichroic dye.
Figure 2B:
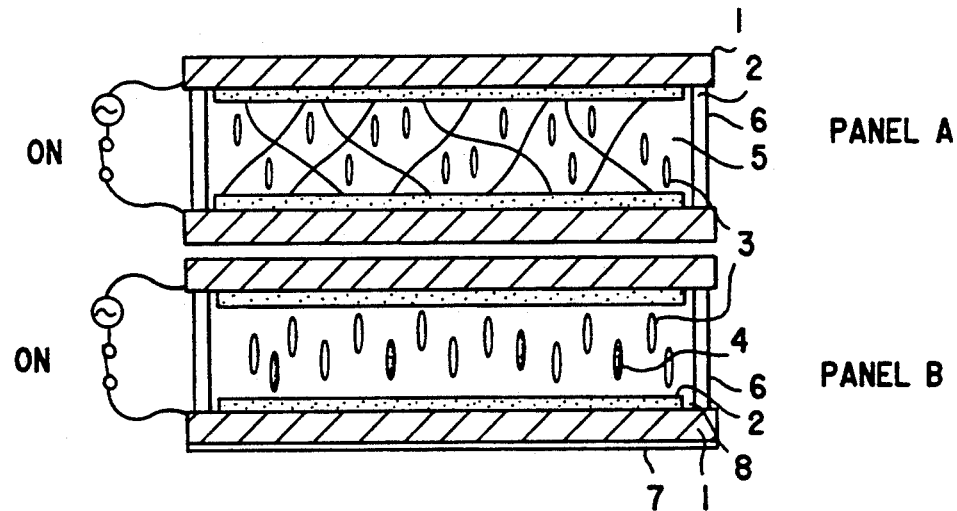

The double structure of the devices having a guest-host type liquid crystal display panel are shown in FIGS. 1 and 2. The device of FIG. 1 has is for B/W display, and that of FIG. 2 has a color filter for full color display. Numerals in these figures indicate the following element:

| 1 | Substrate | 2 | Transparent electrode |
|---|---|---|---|
| 3 | Liquid crystal material | 4 | Dichroic dye |
| 5 | Light controlling layer | 6 | Sealant |
| 7 | Reflective plate | 8 | RGB color filter |

Panel A is the first display panel of light scattering type, and panel B is the second display panel of guest-host type containing a dichroic dye.

In FIG. 1-(a) in which no voltage is applied to panel A, light incident on the side of panel A is scattered in light controlling layer 5 to make white turbidity, while some light going straight enters into panel B to which a voltage is applied, is transmitted therethrough without being substantially absorbed by black dichroic dye 4, and reflected on white reflective plate 7 on the back side whereby the device gives a white vision when seen from the side of panel A.

In FIG. 1-(b) in which a voltage is applied to panel A, incident light is transmitted through light controlling layer 5 and enters into panel B to which no voltage is applied. In panel B, incident light is absorbed by black dichroic dye 4, whereby the device gives a black vision when seen from the side of panel A. The same mechanism applies to a transmission display device in which a back light is set on the background of panel B. In order to make the black color clearer, a polarizer may be provided between panels A and B or on the back side of panel B.

In FIG. 2-(a) in which no voltage is applied to panel A, incident light is scattered in light controlling layer 5 to make white turbidity, while some light going straight enters into panel B with no voltage applied thereto. In panel B, the incident light is absorbed by black dichroic dye 4 so that the color of RGB color filter 8 is not visible from the side of panel A.

In FIG. 2-(b) in which a voltage is applied to panel A, incident light is transmitted through light controlling layer 5 and enters into panel B with a voltage applied thereto. The incident light is transmitted through panel B and RGB color filter 8 without being substantially absorbed by black dichroic dye 4 so that the color of RGB filter 8 is visible from the side of panel A. The same mechanism applies to a transmission device in which a back light is set on the back side. A polarizer may be provided between panels A and B or on the back side of panel B.

The double structure of the liquid crystal device in which the second display panel is a twisted nematic liquid crystal display panel having a pair of polarizers is shown in FIGS. 3 through 8.

Figure 3A:
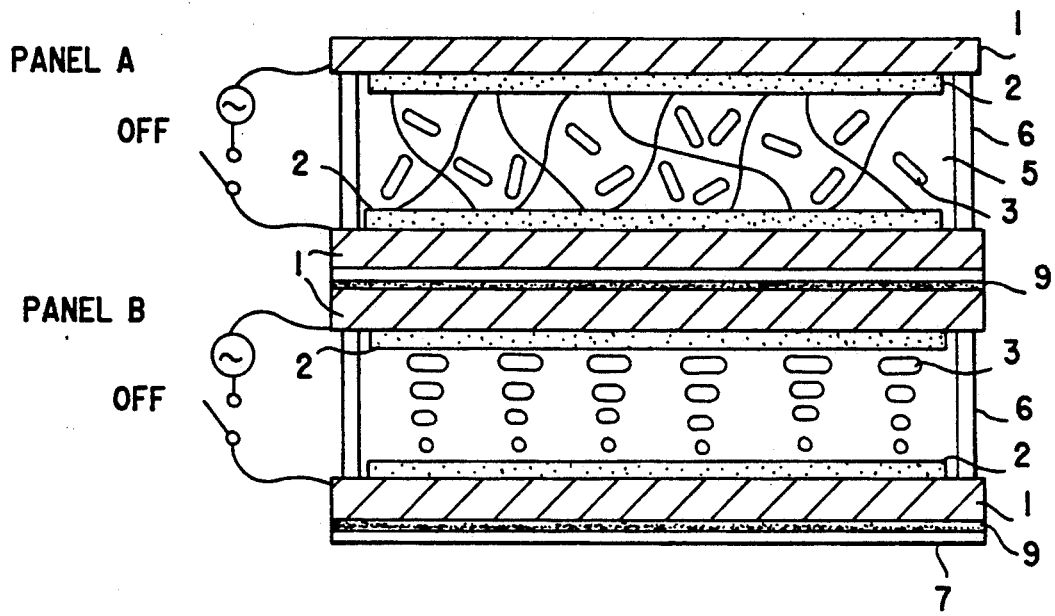
FIGS. 3 (a-b) illustrates a cross section of the B/W light scattering type liquid crystal device according to the present invention in which a pair of polarizers are perpendicular to each other.
Figure 3B:
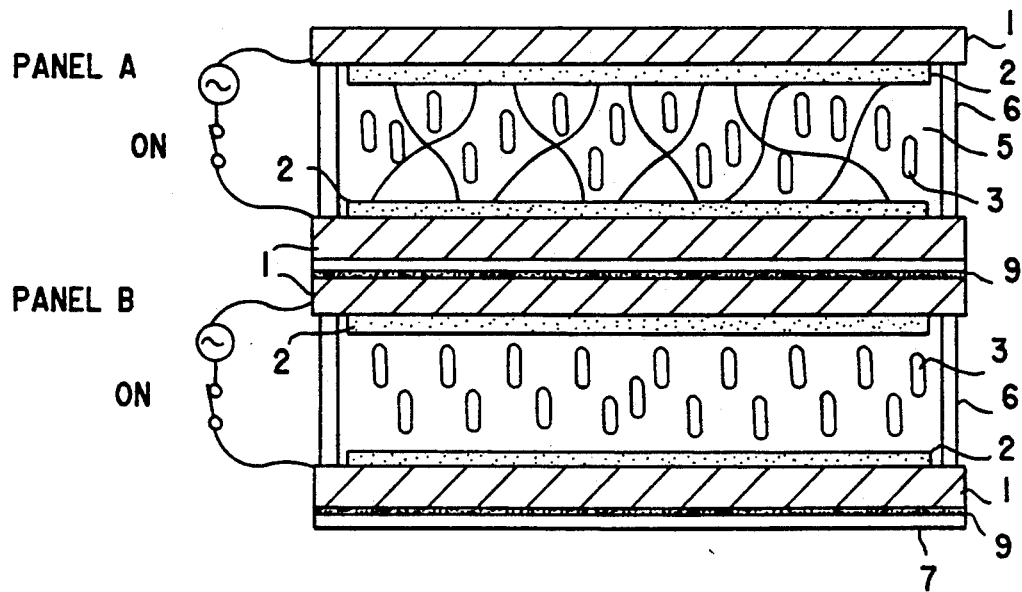

In FIG. 3, numeral 9 indicates a polarizer; panel A is a light scattering type first liquid crystal display panel; and panel B is a twisted nematic type second liquid crystal display panel. The two polarizers 9 are perpendicular to each other.

In FIG. 3-(a) in which no voltage is applied to panel A, incident light is scattered in light controlling layer 5 to make white turbidity, while some light going straight enters into panel B with no voltage applied thereto. The incident light is transmitted through panel B while being polarized at an angle of 90° by twisted liquid crystal 3 and reflected by white reflective plate 7 on the back side, whereby the device looks white when seen from the side of panel A.

In FIG. 3-(b) in which a voltage is applied to panel A, incident light is transmitted through light controlling layer 5 and enters into panel B with a voltage applied thereto. The incident light is cut off by a pair of polarizers 9 perpendicular to each other, whereby the device gives a black vision when seen from the side of panel A.

While the device of FIG. 3 is of a reflection type, the same mechanism also applies to a device of transmission type in which reflective plate 7 is not provided and a back light is set instead at the back of panel B.

Figure 4A:
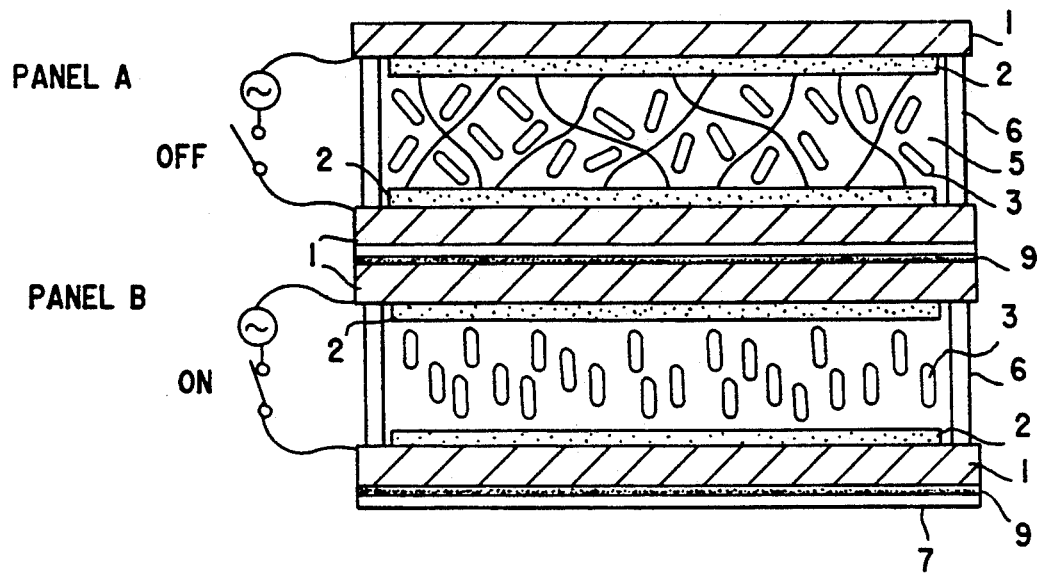
FIGS. 4 (a-b) illustrates a cross section of the B/W light scattering type liquid crystal device according to the present invention in which a pair of polarizers are parallel to each other.
Figure 4B:
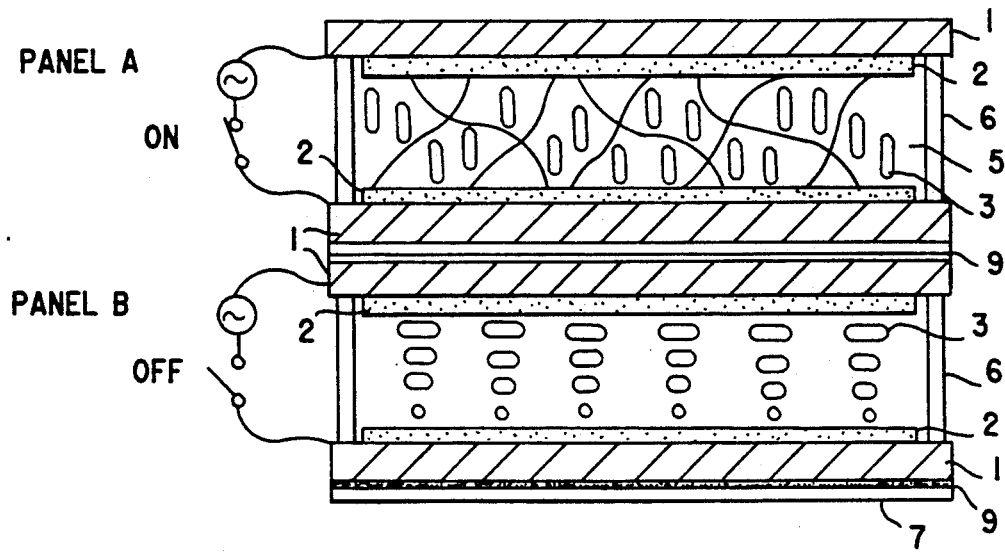

In FIG. 4, panel A is a first liquid crystal display panel of a light scattering type, and panel B is a second liquid crystal display panel of twisted nematic type in which a pair of polarizers 9 are parallel to each other.

In FIG. 4-(a) in which no voltage is applied to panel A, and a voltage is applied to panel B, incident light is scattered in light controlling layer 5 of panel A to make white turbidity while some light going straight enters into panel B. The incident light is transmitted through panel B and reflected on white reflective plate 7, whereby the device looks white when seen from the side of panel A.

In FIG. 4-(b) in which a voltage is applied to panel A, and no voltage is applied to panel B, incident light is transmitted through light controlling layer 5 and enters into panel B, where it is polarized at an angle of 90° by twisted light crystal material 3 and cut off by a pair of parallel polarizers 9, whereby the device gives a black vision when seen from the side of panel A.

While the device of FIG. 4 is of a reflection type, the same mechanism also applies to a device of a transmission type in which reflective plate 7 is not provided and, instead, a back light is set on the back side of panel B.

Figure 5A:
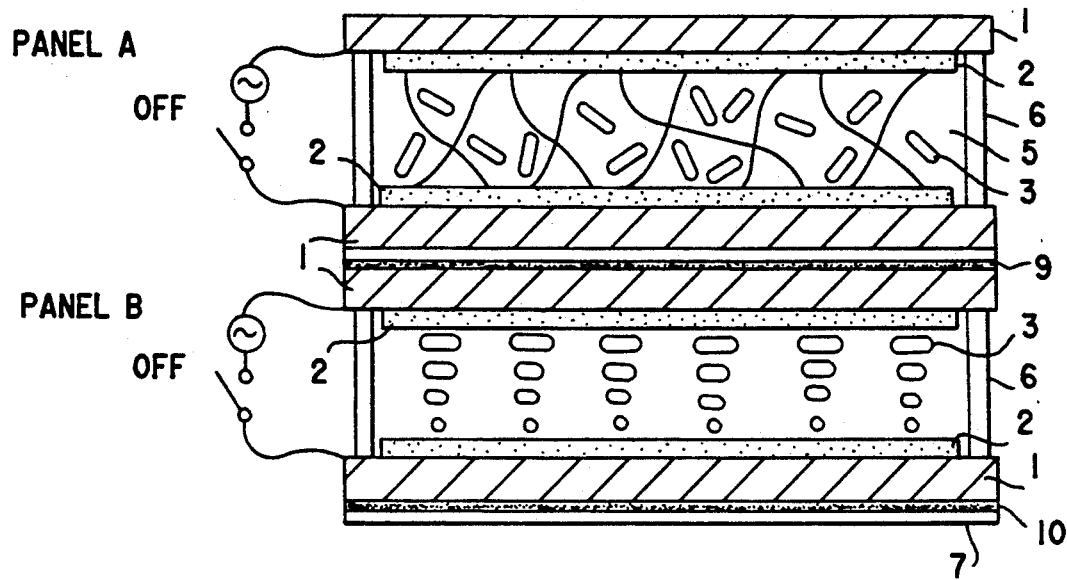
FIGS. 5 (a-b) illustrates a cross section of the color light scattering type liquid crystal device according to the present invention in which a pair of polarizers are perpendicular to each other.
Figure 5B:
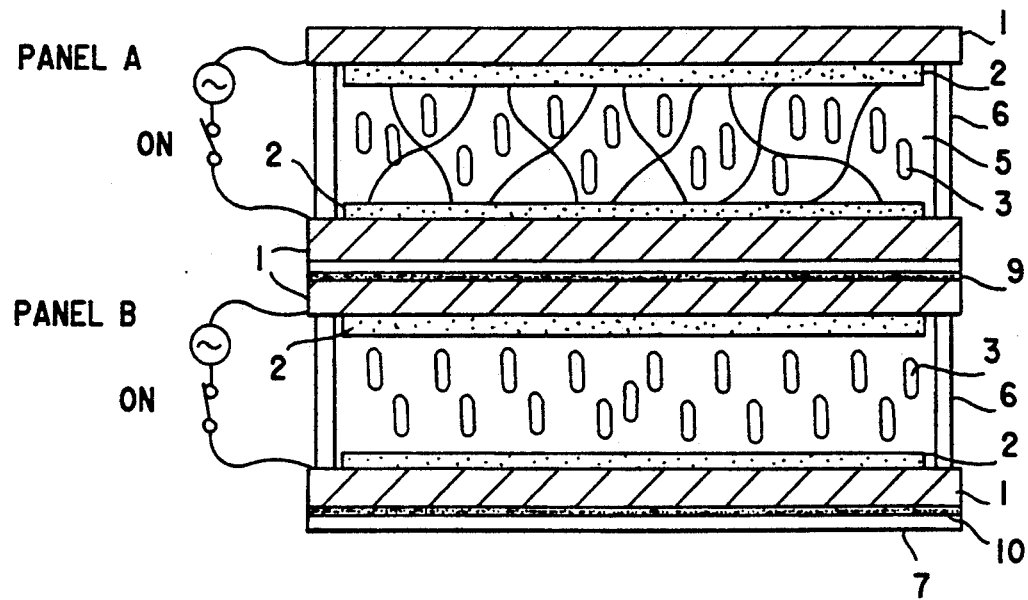
Figure 6A:
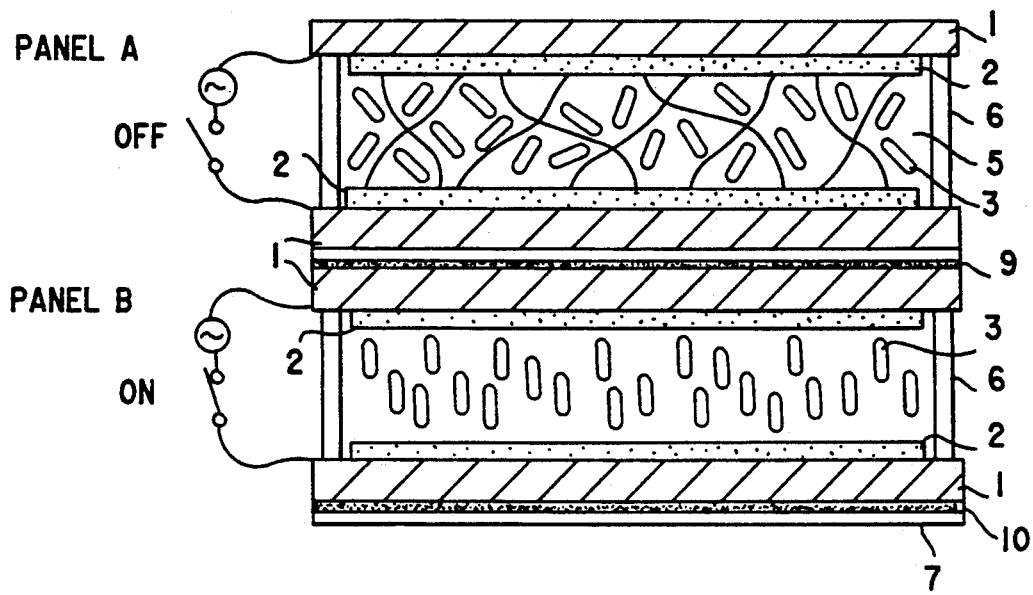
FIGS. 6 (a-b) illustrates a cross section of the color light scattering type liquid crystal device according to the present invention in which a pair of polarizers are parallel to each other.
Figure 6B:
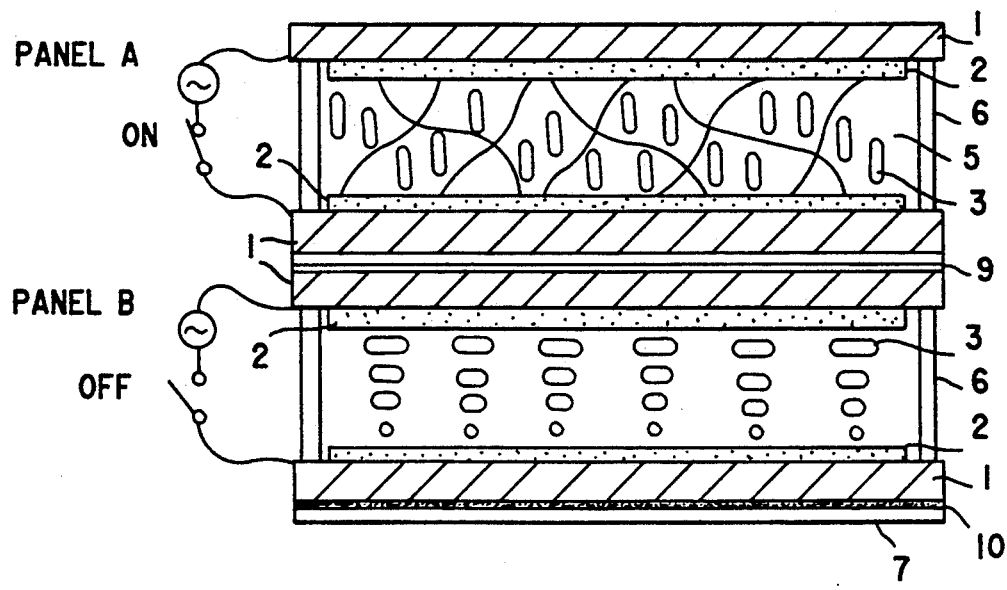

FIGS. 5 and 6 show the liquid crystal device of the present invention for color display, in which numeral 10 is a color polarizer.

In FIG. 5, panel A is a first liquid crystal display panel of a light scattering type, panel B is a second liquid crystal display panel of a twisted nematic type, and a pair of polarizers 9, 10 are perpendicular to each other.

In FIG. 5-(a) in which voltage is applied to neither panel A or panel B, incident light is scattered in light controlling layer 5 of panel A to make white turbidity, while some light going straight enters into panel B. The incident light on panel B is transmitted therethrough while being polarized at an angle of 90° by twisted liquid crystal material 3 and reflected on white reflective layer 7, whereby the device looks white when seen from the side of panel A.

In FIG. 5-(b) in which a voltage is applied to both panels A and B, incident light is transmitted through panel A and enters into panel B and cut off by a pair of polarizers 9, 10, whereby the device makes a color display when seen from the side of panel A.

While the device of FIG. 5 is of a reflection type, the same mechanism also applies to a device of a transmission type in which reflective plate 7 is not provided and, instead, a back light is provided on the back side of panel B.

In FIG. 6, panel A is a first liquid crystal display panel of light scattering type, panel B is a second liquid crystal display panel of a twisted nematic type, and a pair of polarizers 9, 10 are parallel to each other.

In FIG. 6-(a) in which no voltage is applied to panel A, and a voltage is applied to panel B, incident light is scattered in light controlling layer 5 of panel A, while some light going straight enters into panel B. The incident light on panel B is transmitted therethrough and reflected on white reflective layer 7, whereby the device looks white when seen from the side of panel A.

In FIG. 6-(b) in which a voltage is applied to panel A, and no voltage is applied to panel B, incident light is transmitted through panel A and enters into panel B, where it is polarized at an angle of 90° by liquid crystal material 3 and cut off by a pair of parallel polarizers 9, 10, whereby the device makes a color display when seen from the side of panel A.

While the device of FIG. 6 is of a reflection type, the same mechanism also applies to a device of a transmission type in which reflective plate 7 is not provided and, instead, a back light is proved on the back side of panel B.

Figure 7A:
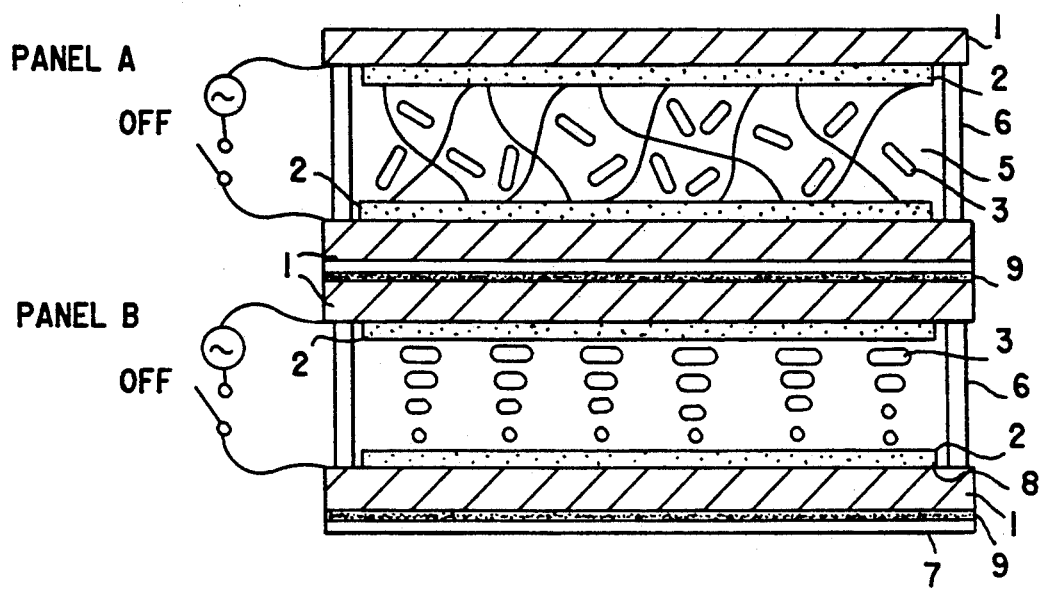
FIGS. 7 (a-b) illustrates a cross section of the full color light scattering type liquid crystal device according to the present invention in which a pair of polarizers are parallel to each other.
Figure 7B:
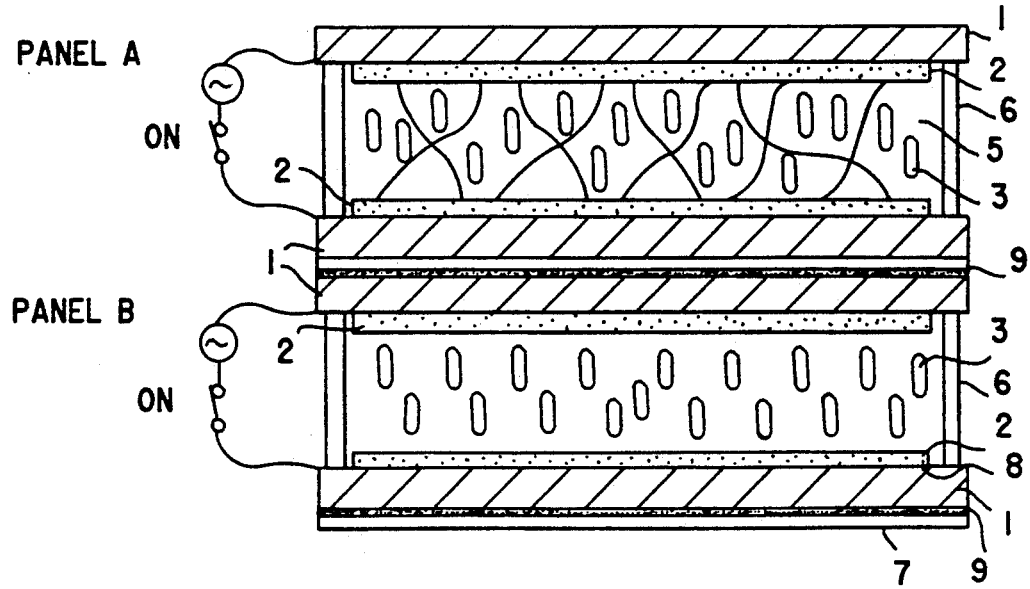
Figure 8A:
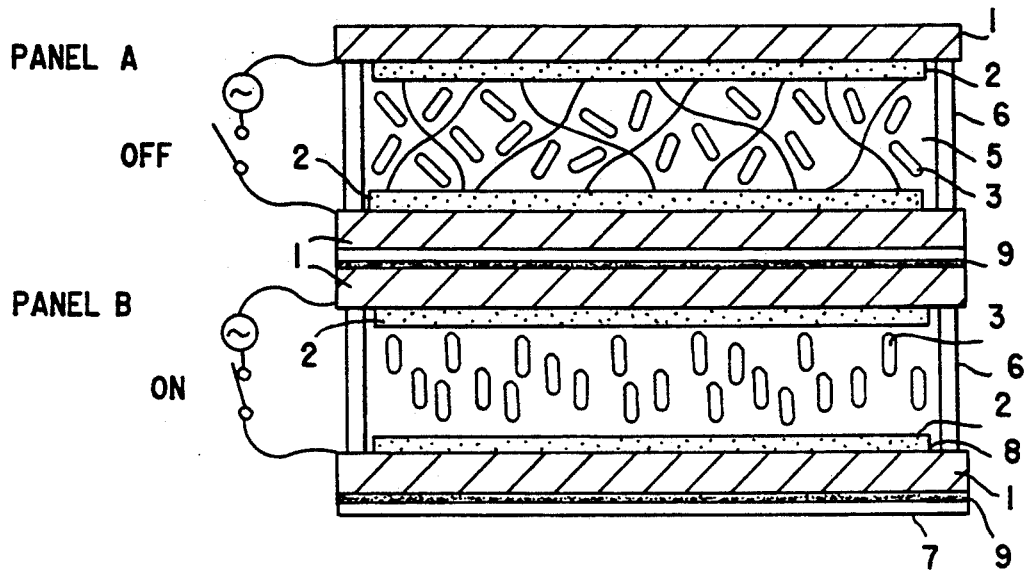
FIGS. 8 (a-b) illustrates a cross section of the full color light scattering type liquid crystal device according to the present invention in which a pair of polarizers are perpendicular to each other.
Figure 8B:
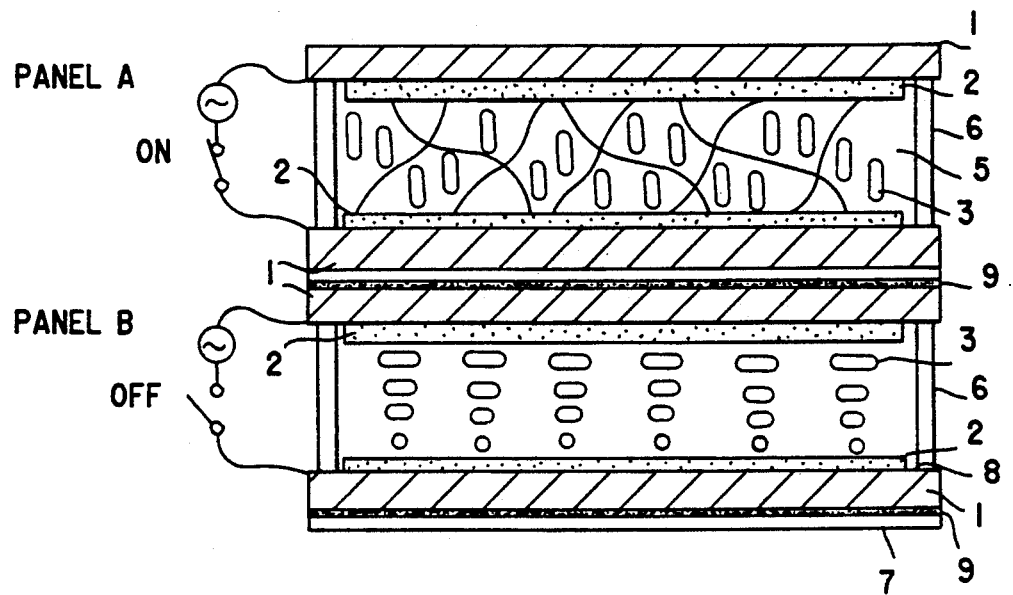

FIGS. 7 and 8 show the liquid crystal device of the present invention which has a color filter for full color display.

In FIG. 7, panel A is a first liquid crystal display panel of a light scattering type, panel B is a second liquid crystal display panel of a twisted nematic type, and a pair of polarizers 9 are parallel to each other.

In FIG. 7-(a) in which a voltage is applied neither to panel A or panel B, incident light is scattered by light controlling layer 5 of panel A to make white turbidity, while some light going straight enters into panel B, where it is polarized at an angle of 90° by twisted liquid crystal material 3 and cut off by a pair of polarizers 9, whereby the color of RGB color filter 8 is not visible from the side of panel A.

In FIG. 7-(b) in which a voltage is applied to both panels A and B, incident light is transmitted through panel A and enters into panel B, where it is transmitted through RGB color filter 8 to make the color of RGB color filter 8 visible from the side of panel A.

While the device of FIG. 7 is of a reflection type, the same mechanism also applies to a device of a transmission type in which reflective plate 7 is not provided and, instead, a back light is proved on the back side of panel B.

In FIG. 8, panel A is a first liquid crystal display panel of a light scattering type, panel B is a second liquid crystal display panel of a twisted nematic type, and a pair of polarizers 9 are perpendicular to each other.

In FIG. 8-(a) in which no voltage is applied to panel A, and a voltage is applied to panel B, incident light is scattered by light controlling layer 5 of panel A to make white turbidity, while some light going straight entered into panel B, where it is cut off by a pair of perpendicular polarizers 9, whereby the color of RGB color filter 8 is not visible from the side of panel A.

In FIG. 8-(b) in which a voltage is applied to panel A, and no voltage is applied to panel B, incident light is transmitted through panel A and enters into panel B, where it is transmitted therethrough while being polarized at an angle of 90° by twisted liquid crystal 3 and then transmitted through RGB color filter 8, whereby the color of RGB color filter 8 is visible from the side of panel A.

While the device of FIG. 8 is of a reflection type, the same mechanism also applies to a device of a transmission type in which reflective plate 7 is not provide and, instead, a back light is provided on the back of panel B.

The light scattering liquid crystal devices shown in FIGS. 1 through 8 are excellent in contrast. If desired, a display with excellent grey scale level can easily be obtained by merely changing the manner of combination of the two panels in each case with the driving circuit being unchanged.

In the twisted mode liquid crystal display panel according to the present invention, the twist angle is not limited to 90° and it is preferably in the range of 70° to 110°.

The second display panel according to the present invention is not limited to a twisted nematic mode liquid crystal display panel and it may be a super-twisted nematic mode liquid crystal display panel, the twist angle of which is preferably in the range of 180° to 270°.

The light scattering liquid crystal device having a double structure according to the present invention can be used with a conventionally known active device. In this case, the active device can be used either in the first or second display panel. It is preferred, however, to use the active device in the first display panel. In this case, though various nematic liquid crystal display panels can be used as the second display panel, it is preferred to use a super-twisted nematic mode liquid crystal display panel which has a retardation film and a pair of polarizers.

Substrates which can be used in the present invention include hard materials such as glass and flexible materials such as synthetic resin films. A pair of substrates are assembled to face to each other with an appropriate gap therebetween. The substrates should be transparent so that the entire or part of the supported liquid crystal layer and light controlling layer containing a transparent solid substance may be visible from the outside.

In cases where a flexible material, such as a synthetic resin film, is used as a substrate, it can be used as fixed on a hard material.

A spacer for gap retention may be incorporated between the two substrates as is usual in conventional liquid crystal devices. Examples of useful spacers are Mylar, alumina, rod type glass fiber, glass beads, polymer beads, etc.

The liquid crystal material which can be used in the present invention includes not only a single liquid crystal compound but of course a mixture comprising two or more liquid crystal compounds and, if desired, other substances. All the materials recognized as liquid crystal materials in the art can be employed. Among them, those having a positive dielectric anisotropy are preferred. Liquid crystals to be used preferably include nematic liquid crystals, smectic liquid crystals, and cholesteric liquid crystals, with nematic liquid crystals being particularly preferred. For the purpose of improving performance properties, the liquid crystals may contain chiral compounds, e.g., chiral dopants, cholesteric liquid crystals, chiral nematic liquid crystals, and chiral smectic liquid crystals.

More specifically, liquid crystal materials which can be used in the present invention include compositions comprising liquid crystal compounds appropriately selected from among the following compounds taking into consideration desired characteristics, such as an isotropic liquid-liquid crystal phase transition temperature, a melting point, a viscosity, birefringence ($\Delta n$), dielectric anisotropy ($\Delta \epsilon$), and miscibility with a polymerizable composition.

Examples of useful liquid crystal compounds are 4-substituted benzoic acid 4'-substituted phenyl esters, 4-substituted cyclohexanecarboxylic acid 4'-substituted phenyl esters, 4-substituted cyclohexanecarboxylic acid 4'-substituted biphenyl esters, 4-(4-substituted cyclohexanecarbonyloxy)benzoic acid 4'-substituted phenyl esters, 4-(4-substituted cyclohexyl)benzoic acid 4'-substituted phenyl esters, 4-(4-substituted cyclohexyl)benzoic acid substituted cyclohexyl esters, 4-substituted-4'-substituted biphenyls, 4-substituted phenyl-4'-substituted cyclohexanes, 4-substituted 4''-substituted terphenyls, 4-substituted biphenyl-4'-substituted cyclohexane, and 2-(4-substituted phenyl)-5-substituted pyrimidines.

The light controlling layer of the first panel includes a dispersion of microcapsules of liquid crystals obtained by encapsulation with polyvinyl alcohol, etc. as disclosed in JP-W-58-501631, a dispersion of liquid crystal droplets in an epoxy resin matrix as disclosed in JP-W-61-502128, a dispersion of liquid crystal droplets in a photocured polymer which is obtained by phase separation by exposure to light as disclosed in JP-A-61-305528, and a continuous phase of a liquid crystal material in which a polymer forms a three-dimensional network as disclosed in JP-A-1-198725. For example, a light controlling layer comprising a continuous phase of a liquid crystal material in which a polymer forms a three-dimensional network preferably contains at least 60% by weight, and particularly from 70 to 90% by weight, of the liquid crystal material.

The transparent solid substance forming a network structure in the light controlling layer preferably includes thermosetting resins and ultraviolet curing resins obtained by polymerization of polymer-forming monomers or oligomers.

Specific examples of the polymer-forming monomers are styrene and derivatives thereof, e.g., chlorostyrene, α-methylstyrene, and divinylbenzene; acrylates, methacrylates or fumarates having a substituent, e.g., methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, allyl, methallyl, glycidyl, 2-hydroxyethyl, 2-hydroxypropyl, 3-chloro-2-hydroxypropyl, dimethylaminoethyl, and diethylaminoethyl; a mono- or poly(meth)acrylate of ethylene glycol, polyethylene glycol, propylene glycol, polypropylene glycol, 1,3-butylene glycol, tetramethylene glycol, hexamethylene glycol, neopentyl glycol, trimethylolpropane, glycerin, or pentaerythritol; vinyl acetate, vinyl butyrate, or vinyl benzoate, acrylonitrile, cetyl vinyl ether, limonene, cyclohexene, diallyl phthalate, diallyl isophthalate, 2-, 3-, or 4-vinylpyridine, acrylic acid, methacrylic acid, acrylamide, methacrylamide, N-hydroxymethylacrylamide or N-hydroxyethylmethacrylamide or an alkyl ether thereof; a di(meth)acrylate of a diol obtained by addition of 2 or more mols of ethylene oxide or propylene oxide to 1 mol of neopentyl glycol; a di- or tri(meth)acrylate of a triol obtained by addition of 3 or more mols of ethylene oxide or propylene oxide to 1 mol of trimethylolpropane; a di(meth)acrylate of a diol obtained by addition of 2 or more mols of ethylene oxide or propylene oxide to 1 mol of bisphenol A; a reaction product between 1 mol of 2-hydroxyethyl (meth)acrylate and 1 mol of phenyl isocyanate or n-butyl isocyanate; and dipentaerythritol poly(meth)acrylate. Preferred of them are trimethylolpropane triacrylate, tricyclodecanedimethylol diacrylate, polyethylene glycol diacrylate, polypropylene glycol diacrylate, hexanediol diacrylate, neopentyl glycol diacrylate, and tris(acryloxyethyl) isocyanurate.

Specific examples of the polymer-forming oligomers include caprolactone-modified hydroxypivalic ester neopentyl glycol diacrylate.

Polymerization initiators to be used include 2-hydroxy-2-methyl-1-phenylpropan-1-one ("Darocure 1173" produced by Merck Co.), 1-hydroxycyclohexyl phenyl ketone ("Irgacure 184" produced by Ciba Geigy), 1-(4-isopropylphenyl)-2-hydroxy-2-methylpropan-1-one ("Darocure 1116" produced by Merck Co.), benzyl dimethyl ketal ("Irgacure 651" produced by Ciba Geigy), 2-methyl-1-[4-(methylthio)phenyl]-2-morpholinopropane-1 ("Irgacure 907" produced by Ciba Geigy), a mixture of 2,4-diethylthioxanthone ("Kayacure DETX" produced by Nippon Kayaku Co., Ltd.) and ethyl p-dimethylaminobenzoate ("Kayacure EPA" produced by Nippon Kayaku Co., Ltd.), and a mixture of isopropylthioxanthone ("Quantacure ITX" produced by Ward Blenkinsop Co.) and ethyl p-dimethylaminobenzoate. From the standpoint of compatibility with a liquid crystal material and a polymer-forming monomer or oligomer, liquid 2-hydroxy-2-methyl-1-phenylpropan-1-one is particularly preferred.

The light controlling layer comprising a continuous layer of a liquid crystal material in which a transparent solid substance forms a uniform three-dimensional network structure can be formed by, for example, filling a uniform solution comprising (a) a liquid crystal material, (b) a polymer-forming monomer or oligomer and, if desired, (c) a photopolymerization initiator while in an isotropic phase into a gap between a pair of substrates having a transparent electrode layer and applying radiation, e.g., ultraviolet rays and electron rays, or heat to the filled solution to cause polymerization curing to form a three-dimensional network structure. The solution may be supported between the substrates by coating the solution on one of substrates having a transparent electrode layer with an appropriate coater, e.g., a spin coater, and then superposing the other substrate thereon.

Methods for uniformly forming a network layer of a transparent solid substance on a substrate are not limited to the above-mentioned techniques.

The thickness of the light controlling layer may be controlled by incorporating a spacer into the solution to be filled or coated or by previously coating a spacer on the substrate.

The thus formed three-dimensional network structure of a transparent solid substance preferably has an average mesh size ranging from 0.2 to 2 $\mu$m. If the mesh size is too large or too small for a wavelength of light, light scattering properties tend to be reduced. In order to obtain a contrast sufficient for the end use between opaqueness due to light scattering and electrically induced transparency, the thickness of the light controlling layer preferably ranges from 2 to 30 $\mu$m, and particularly from 5 to 20 $\mu$m.

The liquid crystal materials which can be used in the second liquid crystal display panel are not particularly limited, and any of those usable in the first display panel can be adopted.

Dichroic dyes which can be used in the guest-host type liquid crystal display panel are not particularly limited as far as suitable for liquid crystal use. Examples of suitable dichroic dyes include anthraquinone dyes, azo dyes, quinophthalone dyes, perylene dyes, coumarin dyes, thioindigo dyes, merocyanine dyes, styryl dyes, and oxonol dyes. These dichroic dyes are commercially available under trade names of "SI-497" (blue hue), "M-137" (blue hue), "SI-426" (red hue), "S-416" (black hue), and "S-344" (black hue), all produced by Mitsui Toatsu Chemicals Inc.; "LCD-118" (blue hue), "LCD-208" (red hue), and "LCD-465" (black hue), all produced by Nippon Kayaku Co., Ltd.; and "CLD-506" (blue hue) produced by Sumitomo Chemical Co., Ltd.

The dichroic dye is preferably added in an amount of from 0.01 to 10% by weight based on the liquid crystal material.

The guest-host type liquid crystal display panel can be produced according to well-known methods.

A double structure of the thus produced light scattering type liquid crystal display panel and guest-host type liquid crystal display panel provides a light scattering liquid crystal device of direct view type making a B/W or full color display with high contrast and brightness.

The twisted or super-twisted nematic liquid crystal display panel which can be used as the second display panel is not particularly restricted, and any of known twisted nematic liquid crystal display elements for single use can be employed.

For example, the two polarizers which can be used in the twisted or super-twisted nematic liquid crystal display panel is selected appropriately from so-called normally white or normally black polarizers according to whether weight is attached to contrast or visual characteristics. Similarly, the color polarizers or color filters can be selected without any particular restriction.

Examples of suitable commercially available polarizers include "LLC 2-81-12S" (neutral gray), "SCR-18" (red), "SCB-18" (blue), "SCG-18" (green), and "SCM-18" (magenta), all produced by Sanritsu Denki K. K.

While color filter 8 of panel B in FIGS. 7 and 8 is provided between substrate 1 and transparent electrode layer 2 on the side farther from panel A, it may be provided between substrate 1 and polarizer 9 or between polarizer 9 and reflective player 7 on the same side according to the end use, for example large-sized display or precise display, or from the economical consideration.

While not limiting, fixing of the light scattering panel A and the nematic panel B can be effected with an adhesive, a curing resin, etc. or by use of a polarizer having an adhesive layer on both sides thereof. Further, an air layer may be present between panels A and B.

The present invention is now illustrated in greater detail with reference to Examples, but it should be understood that the present invention is not deemed to be limited thereto. All the percents are given by weight unless otherwise indicated.

EXAMPLE 1

A solution consisting of 19.8% of trimethylolpropane triacrylate as a polymer-forming monomer, 0.2% of 2-hydroxy-2-methyl-1-phenylpropan-1-one as a polymerization initiator, and 80% of liquid crystal material (A) having the following composition was prepared, and a small amount of alumina powder having an average particle size of 10 $\mu$m was added thereto as a spacer. The mixture was filled between a pair of 20 cm wide and 20 cm long glass plates each having an ITO electrode layer, assembled with an electrode gap of 11 $\mu$m. The resulting unit panel was passed under a metal halide lamp (80 W/cm$^2$) at a speed of 3.5 m/min to irradiate ultraviolet light at a dose corresponding to 500 mJ/cm$^2$ on the liquid material to cure the polymer-forming monomer. The resulting panel was used as panel A. Observation of the section of the light controlling layer formed between the glass plates under a scanning electron microscope revealed a three-dimensional network structure comprising a transparent solid substance.

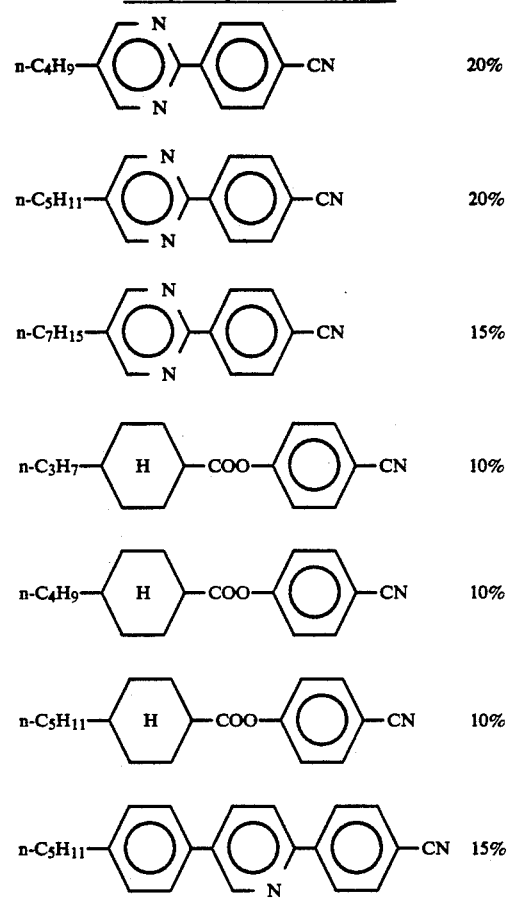

Phase transition temperature

| | |
|---|---|
| 77° C. | (N ⇌ I) |
| −8° C. | (C ⇌ N) |

(C: crystal phase; N: nematic phase; I: isotropic phase)
Refractive index

| |
|---|
| $n_e$ = 1.716 |
| $n_o$ = 1.509 |
| $\Delta n$ = 0.207. |

Threshold voltage ($V_{th}$): 1.21 V
Viscosity at 20°: 57.1 c.p.

A general twisted nematic liquid crystal device comprising a pair of transparent substrates each having an electrode layer and a liquid crystal material comprising 98% of "RDX-5082" (a liquid crystal produced by Rodic Co.) and 2% of a black dichroic dye "S-416" was set on the above prepared panel A with panel A upside. The cross section of the resulting device is shown in FIG. 1.

A contrast ratio of (a) the state with panel A "off" and panel B driven at 5V to (b) the state with panel A driven at 20 V and panel B "off" was 28:1.

EXAMPLE 2

Panel A was produced in the same manner as in Example 1.

A twisted nematic liquid crystal display panel comprising a pair of neutral gray polarizers "LLC 2-81-12S" perpendicular to each other having filled therebetween a liquid crystal material "RDX-5082" was prepared, and a reflective plate was attached to one of the polarizers to obtain panel B.

Panels A and B were set up panel A upside and the reflective plate of panel B downside. The cross section of the resulting device is shown in FIG. 3.

A contrast ratio of (a) the state with no voltage applied to either panel A or B (FIGS. 3-(a)) to (b) the state with panel A driven at 20 V and panel B driven at 5 V (FIG. 3-(b)) was 32:1.

COMPARATIVE EXAMPLE 1

Panel A was prepared in the same manner as in Example 1. A black back screen was placed on the back side of panel A to prepare a liquid crystal device. The contrast ratio of the device was 6:1.

EXAMPLE 3

A liquid crystal device having a double structure was prepared in the same manner as in Example 2, except that the neutral gray polarizer with a reflective plate was replaced with a red color polarizer "SCR-18" with a reflective plate. The resulting device made a clear white/red display.

EXAMPLES 4 TO 6

A liquid crystal device having a double structure was prepared in the same manner as in Example 2, except for replacing the neutral gray polarizer with a reflective plate with a blue color polarizer "SCB-18", a green color polarizer "SCG-18", or a magenta color polarizer "SCM-18" each with a reflective plate. Any of the resulting devices made a clear color display.

EXAMPLE 7

A direct view type liquid crystal device having a double structure was prepared in the same manner as in Example 2, except for using a TFT (Thin Film Transistor)-twisted nematic liquid crystal panel having an RGB color filter as panel B. The resulting liquid crystal device made a clear full color display.

As described above, the light scattering liquid crystal device of double structure according to the present invention achieves an extremely high contrast when formulated into a direct view type as compared with the conventional light scattering liquid crystal devices having a single panel structure.

According to the present invention, a combination of the first panel with a guest-host liquid crystal panel containing a dichroic dye and having a color filter or with a twisted nematic liquid crystal panel having a color filter makes it possible to accomplish a direct view type full color display that has been impossible with the conventional light scattering liquid crystal devices.

It was ascertained that such high contrast as obtained by using a first panel in which a liquid crystal material forms a continuous phase can also be reached by using a first panel comprising liquid crystal droplets dispersed in a polymer such as NCAP (Nematic Curvilinear Aligned Phase).

Thus, the liquid crystal device of the present invention is useful as a direct view type display, for example, as a computer terminal display.

While the invention has been described in detail and with reference to specific examples thereof, it will be apparent to one skilled in the art that various changes and modifications can be made therein without departing from the spirit and scope thereof.

What is claimed is:

1. A light scattering liquid crystal device having a double structure composed of (1) a first display panel of light scattering type which comprises a pair of transparent substrates each having a transparent electrode layer and a light controlling layer formed therebetween, said light controlling layer containing a liquid crystal material and a transparent solid substance and (2) a second display panel comprising a pair of transparent substrates each having an electrode layer and a liquid crystal material filled therebetween.

2. A light scattering liquid crystal device as claimed in claim 1, wherein said second display panel is a guest-host type liquid crystal display panel containing a dichroic dye.

3. A light scattering liquid crystal device as claimed in claim 2, wherein said dichroic dye is present in an amount of from 0.01 to 10% by weight based on the liquid crystal material.

4. A light scattering liquid crystal device as claimed in claim 1, wherein said second display panel is a twisted nematic liquid crystal display panel having a pair of polarizers.

5. A light scattering liquid crystal device as claimed in claim 4, wherein at least one of said polarizers is a color polarizer.

6. A light scattering liquid crystal device as claimed in claim 4, wherein said polarizers are perpendicular to each other.

7. A light scattering liquid crystal device as claimed in claim 4, wherein said polarizers are parallel to each other.

8. A light scattering liquid crystal device as claimed in claim 1, wherein said second display panel has a color filter.

9. A light scattering liquid crystal device as claimed in claim 2, wherein said second display panel has a color filter.

10. A light scattering liquid crystal device as claimed in claim 4, wherein said second display panel has a color filter.

11. A light scattering liquid crystal device as claimed in claim 1, wherein said second display panel has a reflective plate on the side opposite to said first display panel.

12. A light scattering liquid crystal device as claimed in claim 2, wherein said second display panel has a reflective plate on the side opposite to said first display panel.

13. A light scattering liquid crystal device as claimed in claim 4, wherein said second display panel has a reflective plate on the side opposite to said first display panel.

14. A light scattering liquid crystal device as claimed in claim 1, wherein said light controlling layer of the first panel comprises a continuous phase of the liquid crystal material in which a transparent solid substance forms a three-dimensional network structure.

15. A light scattering liquid crystal device as claimed in claim 2, wherein said light controlling layer of the first panel comprises a continuous phase of the liquid crystal material in which a transparent solid substance forms a three-dimensional network structure.

16. A light scattering liquid crystal device as claimed in claim 4, wherein said light controlling layer of the first panel comprises a continuous phase of the liquid crystal material in which a transparent solid substance forms a three-dimensional network structure.

17. A light scattering liquid crystal device as claimed in claim 1, wherein said light controlling layer of the first panel contains at least 60% by weight of the liquid crystal material.

18. A light scattering liquid crystal device as claimed in claim 2, wherein said light controlling layer of the first panel contains at least 60% by weight of the liquid crystal material.

19. A light scattering liquid crystal device as claimed in claim 4, wherein said light controlling layer of the first panel contains at least 60% by weight of the liquid crystal material.

20. A light scattering liquid crystal device as claimed in claim 19, wherein said light controlling layer has a thickness of from 2 to 30 $\mu$m.

* * * * *